United States Patent Office 2,967,755
Patented Jan. 10, 1961

2,967,755

LEVELING AND STRIPPING AGENTS

Robert Christian Keller, Basel, Switzerland, assignor to Sandoz Ltd., Basel, Switzerland No Drawing. Filed Jan. 30, 1958, Ser. No. 712,066

Claims priority, application Switzerland Feb. 5, 1957

17 Claims. (Cl. 8—84)

The present invention relates to leveling and stripping agents.

In accordance with this invention, the said agents are water-soluble compounds, the cation of which—upon complete dissociation of the compounds in aqueous solution—corresponds to the formula

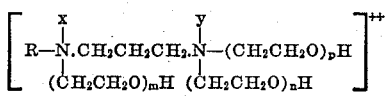

wherein R is an aliphatic hydrocarbon radical containing 8 to 22 carbon atoms, each of $m$, $n$ and $p$ represents a numeral in the range from 0 to 200, the sum of $m+n+p$ being from 10 to 200, and each of $x$ and $y$ represents a hydrogen atom or a lower alkyl or phenyl(lower)alkyl group, $x$ and $y$ being different or identical.

A preferred group of the aforesaid water-soluble compounds is constituted by those compounds, the cation of which—upon complete dissociation of the compounds in aqueous solution—corresponds to the formula

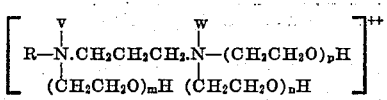

wherein R, $m$, $n$ and $p$ have the significances set forth in the preceding paragraph, the sum of $m+n+p$ being from 10 to 200, one of the substituents $v$ and $w$ being a lower alkyl or phenyl(lower)alkyl group and the other one of $v$ and $w$ being H or a lower alkyl or phenyl(lower)alkyl group. The compounds wherein $m+n+p$ is from 25 to 35 and from 150 to 200 are particularly valuable.

The said compounds are prepared by reacting diamines of the formula $$R—NH.CH_2CH_2CH_2.NH_2 \quad (I)$$

wherein R has the precedingly recited significances, with ethoxylating agents and optionally subsequently also with other alkylating agents.

Diamines of Formula I which are suitable for the present invention are e.g. the following 1,3-propylenediamine derivatives: N-aminopropyloleylamine, N-aminopropylstearylamine, N-aminopropyldodecylamine, N-aminopropylhexadecylamine and monooctadecadienylpropylenediamine.

The amines may be in the pure state or may be technical mixtures such as, for example, N-aminopropyl-R-amines, wherein the R groups correspond to the mixture of alkyl groups present in coconut fatty acids, soya fatty acids or tallow fatty acids (commercial stearic acid).

The above-enumerated propylenediamine derivatives can be prepared according to per se conventional processes from primary fatty amines, for example by reacting the fatty amine with acrylonitrile or with β-chloro-propionitrile to yield the corresponding cyanoethyl fatty amines, the nitrilo group of which is reduced to the corresponding primary amino group.

By primary fatty amines are meant monoalkylamines which can be obtained from high molecular weight fatty acid nitriles by catalytic hydrogenation.

As ethoxylating agents, use may be made for example of ethylene oxide, and also of polyglycols, or monoalkoxy derivatives of the latter, which contain reactive halogen atoms, or of acid polyglycol sulfates. The reaction of the amines with the ethoxylating agents may be carried out according to methods which are per se known. Thus, for example, 10 to 200 mols of ethylene oxide may be added on per mol of amine corresponding to the above given formula, at 140–160° C. in the presence of alkaline catalysts.

The ethoxylated amines can, if desired, be further treated with reagents which are capable of quaternizing basic nitrogen atoms. Such alkylating agents, which may be reacted with the amines in per se known manner, include for example dimethyl sulfate, methyl chloride, benzyl chloride, etc. The products obtained according to the invention are of oily to waxy consistency.

The compounds of the present invention possess valuable interface and surface-active properties, and they have outstanding leveling and stripping capacities for dyestuffs. They may be employed together with dyestuffs of diverse types and with compatible mixtures of such dyestuffs, for example, with dyestuffs or dyestuff mixtures which can be employed for dyeing in an alkaline bath, as for example vat dyestuffs, or with neutral drawing dyestuffs such as the direct dyestuffs, or with dyestuffs which draw from an acid bath, such as the metal-free and metal-containing wool dyestuffs. They are also valuable dispersing agents in dyeing with pigments. The quantity of leveling and stripping agent to be used depends upon the particular conditions, as for example, in accordance with the type and quantity of dyestuffs being employed and upon the character and working condition of the fibrous material being treated. In general, it will amount to about 0.1 to about 5% by weight of the material. The auxiliary agents of the present invention may be added to the dye bath prior to the dyeing operation or in the course of the latter.

The textile material to be treated, for example cotton, regenerated cellulose, wool, silk, casein fibers, polyamide fibers or polyurethane fibers, may be in any desired form, for example as yarn or fabric or may be loose. The material may be constituted by a single type of fiber or by mixtures of various fibers.

The auxiliary agents according to the invention may be employed in the presence of bath additions which are usual in dyeing with the particular dyestuffs or dyestuff being used; thus the auxiliaries may be used in the presence of salts such as sodium sulfate, common salt, ammonium sulfate and sodium acetate, or in the presence of lyes such as caustic soda or in the presence of acids such as sulfuric acid, phosphoric acid, formic acid and acetic acid, or in the presence of buffer mixtures or of dyestuff carriers or of swelling agents such as o-phenylphenol and dichlorobenzene.

Presently preferred representative embodiments of the invention are set forth in the following illustrative examples. In these examples, the parts and percentages are by weight, and the temperatures are in degrees centigrade.

*Example 1*

440 parts of ethylene oxide are added on, at 150 to 170° and in the presence of sodium hydroxide as catalyst, to 400 parts of the commercially available technical propylenediamine of the formula

wherein R—NH— is the "tallow amine" ("Talgamin") radical, the amine being of a purity of about 80% calculated as diamine and melting in the range between about 44 and 48°. The resultant product is a brownish product of good water-solubility and of the consistency of oil at ordinary temperature (about 20 to 30°).

Similar brown products of good water-solubility are obtained when, in the procedure according to the preceding paragraph, instead of 440 parts of ethylene oxide, there are used 660, 1100, 1320, 4400, 6600 or 8800 parts of the latter per 400 parts of the diamine. However, the consistency at ordinary temperature of the so-obtained products changes with the degree of ethoxylation, increasing from the consistency of oil at the lower degree of ethoxylation through the consistency of a salve to the consistency of a soft wax at the higher degrees of ethoxylation.

*Example 2*

880 parts of ethylene oxide are added on, at 140-160° and in the presence of 3 parts of sodium hydroxide, to 320 parts of commercially available technical aminopropylcocosylamine, containing about 80% of amines of the formula set forth in Example 1. A brownish, water-soluble product which is oily at ordinary temperature is obtained.

A similar product is obtained if 1320 parts of ethylene oxide are added instead of 880 parts.

*Example 3*

800 parts of ethylene oxide are added on, at 150-170° and in the presence of sodium hydroxide as catalyst, to 400 parts of technical aminopropylsoyaamine (purity of about 80%).

The procedure is repeated using, instead of 800 parts of ethylene oxide, 1300, 2200, 4000 and 6600 parts, respectively.

The obtained products are all brownish products of good water-solubility, their consistency at ordinary temperature corresponding to that of an oil or of soft wax.

*Example 4*

150 parts of technical tridecaethyleneglycol chloride (Polyethyleneglycolchloride 610, Carbide and Carbon Chem. Co.) are admixed with 40 parts of the technical diamine of formula

R—NH.CH$_2$CH$_2$.CH$_2$NH$_2$ described in Example 1, and the mixture is maintained at 130° for 5 hours. The resultant product is of salve-like consistency at ordinary temperature.

*Example 5*

40 parts of the technical diamine of formula

R—NH.CH$_2$CH$_2$.CH$_2$NH$_2$ (described in Examples 1 and 4) are dissolved in 150 parts of technical xylene mixture. 82 parts of technical nonaethyleneglycol chloride (Polyethyleneglycolchloride 410, Carbide and Carbon Chem. Co.) are added, and the mixture is refluxed for 3½ hours. After cooling the mixture, 8 parts of sodium hydroxide are added in the form of an aqueous solution of 30% strength. The mixture is again boiled for a short time, cooled, and additional 82 parts of Polyethyleneglycolchloride 410 added, and the mixture then maintained at the boil for two more hours. After removing the xylene, the water and the sodium chloride, there is obtained a water-soluble product of salve-like consistency.

*Example 6*

To $\frac{1}{10}$ mol of each of the addition products obtained according to Example 1 by the addition of 440, 660, 1100, 1320, 4400, 6600 and 8800 parts, respectively, of ethylene oxide onto 400 parts of the amine used in the said example, there are added dropwise in the couse of 15 minutes and at 50-60°, 13.9 grams of dimethyl sulfate, after which the mixture is kept at 80° for 30 minutes. The reaction products vary in consistency from oily to soft waxy, and are all of very good water-solubility.

*Example 7*

6 parts of potassium hydroxide in the form of an alcoholic potassium hydroxide solution are stirred into 85 parts of the reaction product obtained according to Example 4. Thereupon 7 parts of dimethyl sulfate are added at 50-60° and the mixture then maintained at 70-80° for 45 minutes. The brownish, oily reaction product thus obtained is clearly water-soluble.

*Example 8*

13 parts of benzyl chloride are added dropwise to 172 parts of addition product obtained according to Example 1 from 400 parts of the amine disclosed in the said example and 1320 parts of ethylene oxide, after which the resultant mixture is heated to 120° for one hour. The obtained reaction product is a brownish, water-soluble oil.

*Example 9*

100 parts of wool in 4000 parts of hank form are dyed in a bath which contains 1 part of Alizarinwalkblau SL (Schultz, page 115), 8 parts of sodium sulfate, 2.5 parts of glacial acetic acid and 0.4 part of the addition product of 1320 parts of ethylene oxide and 400 parts of the amine employed in Example 1. The wool is entered into the bath at 50°, the latter heated to 100° in the course of 45 minutes, and dyeing carried out at the boil for 60 minutes. The resultant dyeing is level.

*Example 10*

The procedure according to Example 9 is repeated, but the ethoxylation product there employed is replaced by the ethoxylating product quaternated with dimethyl sulfate according to Example 6, and the dyestuff of Example 9 is replaced by Xylenwalkblau 6G (Schultz, page 279). The obtained dyeing is level.

*Example 11*

100 parts of wool gabardine are dyed in a bath which consists of 4000 parts of water, 1.2 parts of Solartürkisblau GLL (C.I., Direct Blue 86), 10 parts of sodium sulfate, 2.5 parts of glacial acetic acid and 1.3 parts of the addition product of 660 parts of ethylene oxide and 400 parts of the amine according to Example 1. The dyeing is begun at 50°, the bath heated to boiling in the course of 45 minutes, and the boiling temperature maintained for 1 hour. There is obtained a level dyeing, whereas in the absence of the product of the present invention the resulting dyeing is skittery.

*Example 12*

Nylon which has been unevenly dyed with 3% Xylenwalkorange R (Schultz, page 280) is moved about for 1 hour in a boiling bath (goods to liquid ratio 1:60), the bath containing per unit of weight of nylon 10% of sodium sulfate, 4% of glacial acetic acid and 2% of the condensation product according to Example 3 from 880 parts of ethylene oxide and 400 parts of aminopropylsoyaamine. The dyeing becomes level and is brightened.

*Example 13*

Wool gabardine, dyed with 2% of Neolanrot R (C.I., Acid Red 180), is moved about in a bath which, relative to the weight of the wool, contains 3% of sulfuric acid, 10% of sodium sulfate and 4% of the addition product of 880 parts of ethylene oxide and 400 parts of the amine of Example 1. The dyeing is brightened by this treatment.

*Example 14*

A bath is prepared from 5000 parts of water, 1 part of Lanasynbraun RL (C.I., Acid Brown 28), 8 parts of sodium sulfate and 1.0 part of the reaction product of 400 parts of aminopropylisoyaamine and 6600 parts of ethylene oxide according to Example 3. 100 parts of loose wool are entered into this bath at 50°, after which the temperature of the bath is brought to the boil in the course of 45 minutes, the boiling temperature being maintained for 45 minutes. The resultant dyeing is a level brown.

*Example 15*

A dyebath is prepared which contains, relative to the weight of the material (wool gabardine) to be dyed, 2% of Omegachromcyanin GR (Schultz, page 221), 1% of glacial acetic acid, 10% of sodium sulfate and 0.5% of the addition product of 1320 parts of ethylene oxide onto 400 parts of aminopropylsoyaamine according to Example 3. The wool gabardine is entered into the bath in a goods to liquor ratio of 1:40, the temperature of the bath is raised to the boil in the course of 30 minutes, and boiling is continued for 45 minutes. The bath is then cooled to 70° and the dyeing is developed with 1% of potassium bichromate for 30 minutes at the boil. A full, level dyeing is obtained.

*Example 16*

Cotton is dyed, in a goods to liquor ratio of 1:30, in a bath which contains, relative to the weight of the material to be dyed, 1% of Solarblau 3GLN (C.I., Direct Blue 115), 10% of sodium sulfate and 0.8% of the reaction product from 880 parts of ethylene oxide and 320 parts of aminopropylcocosamine according to Example 2. The rate of bath exhaustion is retarded by the addition of the latter. A like result is obtained when using the reaction product according to Example 5.

*Example 17*

100 parts of cotton gabardine are dyed for 1 hour at 50–60° in 3000 parts of a dyebath which contains 48 parts of 30% aqueous caustic soda solution, 7.5 parts of sodium dithionite, 2 parts of Cibanonviolett 2RB (Schultz, page 159) and 1 part of the addition product of 880 parts of ethylene oxide and 320 parts of aminopropylcocosamine according to Example 2. After conventional oxidation and soaping, a level dyeing is obtained.

*Example 18*

Cotton fabric which had been dyed with 2% of Sandothrenorange R (Schultz, page 242) is moved about for one hour at 30–50° and at a goods to liquor ratio of 1:50 in a blank vat which, per 1000 parts, contains 4 parts of sodium dithionite, 25 parts of aqueous caustic soda solution of 30% strength and 0.9 part of the addition product from 1320 parts of ethylene oxide and 400 parts of the amine employed in Example 1 and which has been treated with dimethyl sulfate according to Example 6. The material is then rinsed and hung in the air. The dye is stripped from the fabric.

In the foregoing examples, "Schultz" refers to Schultz, Farbstofftabellen, 7th ed., suppl. vol. II (1939), and "C.I." refers to Color Index, 2d ed., vol. I (1956), in Examples 13 and 14, and to the corresponding vol. II in Examples 11 and 16.

Having thus disclosed the invention what is claimed is:

1. As a dyeing assistant, a water-soluble compound, the cation of which corresponds, upon complete dissociation of the compound in aqueous solution, to the formula

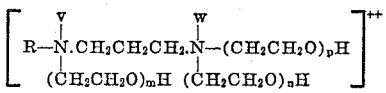

wherein R is an aliphatic hydrocarbon radical containing 8 to 22 carbon atoms, each of *m, n* and *p* represents a whole number from 0 to 200, the sum of $m+n+p$ amounting to 10 to 200, one of the substituents *v* and *w* being a member selected from the group consisting of lower alkyl and phenyl(lower)alkyl, and the other one of the substituents *v* and *w* being selected from the group consisting of H, lower alkyl and phenyl(lower) alkyl.

2. As a dyeing assistant, a water-soluble compound as defined in claim 1, wherein the sum of $m+n+p$ amounts to 25 to 35.

3. As a dyeing assistant, a water-soluble compound as defined in claim 1, wherein the sum of $m+n+p$ amounts to 150 to 200.

4. As a dyeing assistant, a water-soluble compound according to claim 1, wherein one of *v* and *w* is methyl and the other is H.

5. As a dyeing assistant, a water-soluble compound according to claim 1, wherein each of *v* and *w* is methyl.

6. As a dyeing assistant, a water-soluble compound according to claim 1, wherein one of *v* and *w* is benzyl and the other is H.

7. As a dyeing assistant, a water-soluble compound according to claim 1, wherein each of *v* and *w* is benzyl.

8. A method of carrying out a textile material-dyeing operation in an aqueous bath containing a dyestuff which is applicable to the textile material, which comprises immersing the textile material in the said bath in the presence in the bath of a water-soluble compound, the cation of which corresponds, upon complete dissociation of the compound in aqueous solution to the formula

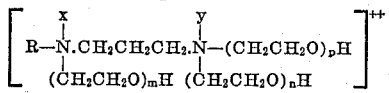

wherein R is an aliphatic hydrocarbon radical containing 8 to 22 carbon atoms, each of *m, n* and *p* represents a whole number from 0 to 200, the sum of $m+n+p$ amounting to 10 to 200 and each of *x* and *y* being selected from the group consisting of H, lower alkyl and phenyl(lower)alkyl.

9. A method of carrying out a textile material-dyeing operation in an aqueous bath containing a dyestuff which is applicable to the textile material, which comprises immersing the textile material in the said bath in the presence in the bath of a water-soluble compound, the cation of which corresponds, upon complete dissociation of the compound in aqueous solution, to the formula

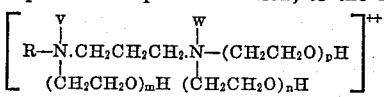

wherein R is an aliphatic hydrocarbon radical containing 8 to 22 carbon atoms, each of *m, n* and *p* represents a whole number from 0 to 200, the sum of $m+n+p$ amounting to 10 to 200, one of the substituents *v* and *w* being a member selected from the group consisting of lower alkyl and phenyl(lower)alkyl, and the other one of the substituents *v* and *w* being selected from the group consisting of H, lower alkyl and phenyl(lower)alkyl.

10. A method of carrying out a textile material-dyeing operation in an aqueous bath containing a dyestuff which is applicable to the textile material, which comprises immersing the textile material in the said bath in the presence in the bath of a water-soluble compound, the cation of which corresponds, upon complete dissociation of the compound in aqueous solution, to the formula

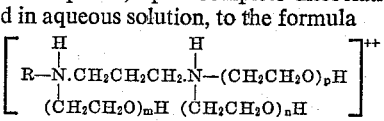

wherein R is an aliphatic hydrocarbon radical containing 8 to 22 carbon atoms, and each of *m, n* and *p* represents a whole number from 0 to 200, the sum of $m+n+p$ amounting to 10 to 200.

11. As a dyeing assistant, a quaternary ammonium compound of the formula

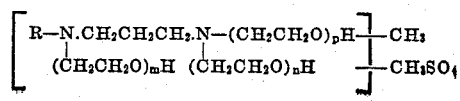

wherein R is an aliphatic hydrocarbon radical containing 8 to 22 carbon atoms, each of $m$, $n$ and $p$ represents a whole number from 0 to 200, and the sum of $m+n+p$ amounting to 10 to 200.

12. As a dyeing assistant, a quaternary ammonium compound of the formula

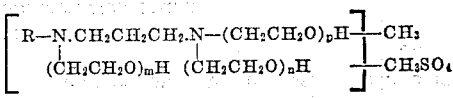

wherein R is the alkyl radical of tallow amine, each of $m$, $n$ and $p$ represents a whole number from 0 to 200, and the sume of $m+n+p$ amounting to 10 to 200.

13. An aqueous bath for dyeing textile material, said bath containing in solution therein about 0.1% to about 5.0% by weight, relatively to the material to be treated, of a water-soluble compound, the cation of which correspond, upon complete dissociation of the compound in aqueous solution, to the formula

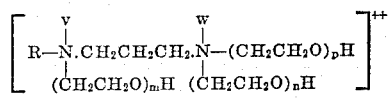

wherein R is an aliphatic hydrocarbon radical containing 8 to 22 carbon atoms, each of $m$, $n$ and $p$ represents a whole number from 0 to 2000, the sum of $m+n+p$ amount to 10 to 200, one of the substituents $v$ and $w$ being a member selected from the group consisting of lower alkyl and phenyl(lower) alkyl, and the other one of the substituents $v$ and $w$ being selected from the group consisting of H, lower alkyl and phenyl(lower) alkyl.

14. An aqueous bath for dyeing textile material, said bath containing in solution therein about 0.1% to about 0.5% by weight, relatively to the material to be treated, of a compound of the formula

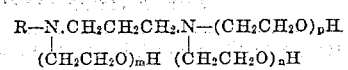

wherein R is an aliphatic hydrocarbon radical containing 8 to 22 carbon atoms, each of $m$, $n$ and $p$ represents a whole number from 0 to 200, and the sum of $m+n+p$ amounting to 10 to 200.

15. An aqueous bath for dyeing textile material, said bath containing in solution therein about 0.1% to about 0.5% by weight, relatively to the material to be treated, of a compound of the formula

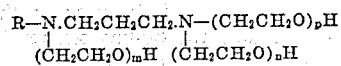

wherein R is the alkyl radical of tallow amine, each of $m$, $n$, and $p$ represents a whole number from 0 to 200, and the sum of $m+n+p$ amounting to 10 to 200.

16. An aqueous bath for dyeing textile material, said bath containing in solution therein about 0.1% to about 0.5% by weight, relatively to the material to be treated, of a compound of the formula

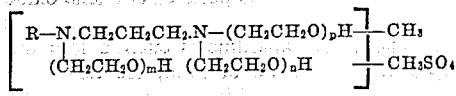

wherein R is an aliphatic hydrocarbon radical containing 8 to 22 carbon atoms, each of $m$, $n$ and $p$ represents a whole number from 0 to 200, and the sum of $m+n+p$ amounting to 10 to 200.

17. An aqueous bath for dyeing textile material, said bath containing in solution therein about 0.1% to about 0.5% by weight, relatively to the material to be treated, of a compound of the formula

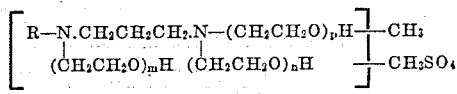

wherein R is the alkyl radical of tallow amine, each of $m$, $n$ and $p$ represents a whole number from 0 to 200, and the sum of $m+n+p$ amounting to 10 to 200.

References Cited in the file of this patent

UNITED STATES PATENTS

| | | |
|---|---|---|
| 2,619,502 | Williams et al. | Nov. 25, 1952 |
| 2,697,118 | Lundsted et al. | Dec. 14, 1954 |
| 2,760,978 | Huebner | Aug 28, 1956 |
| 2,763,530 | Schuetz et al. | Sept. 18, 1956 |
| 2,767,214 | Bersworth | Oct. 16, 1956 |
| 2,772,310 | Morris | Nov. 27, 1956 |

OTHER REFERENCES

Textile Chemicals and Auxiliaries, Speel, Reinhold Publ. Corp., 1952, pp. 328 and 329.